(12) United States Patent
Knowles

(10) Patent No.: US 7,497,311 B2
(45) Date of Patent: Mar. 3, 2009

(54) DRIVE ENGAGEMENT APPARATUS

(75) Inventor: Reginald Knowles, Nottinghamshire (GB)

(73) Assignee: Arthur Knowles, Alfreton, Derbyshire (GB)

(*) Notice: Subject to any disclaimer, the term of this patent is extended or adjusted under 35 U.S.C. 154(b) by 303 days.

(21) Appl. No.: 10/560,566

(22) PCT Filed: Jun. 11, 2004

(86) PCT No.: PCT/GB2004/002496

§ 371 (c)(1),
(2), (4) Date: Apr. 26, 2006

(87) PCT Pub. No.: WO2004/109137

PCT Pub. Date: Dec. 16, 2004

(65) Prior Publication Data

US 2006/0169560 A1 Aug. 3, 2006

(30) Foreign Application Priority Data

Jun. 11, 2003 (GB) .................................. 0313497.0

(51) Int. Cl.
*F16D 23/04* (2006.01)
*F16D 25/08* (2006.01)
(52) U.S. Cl. .................................. 192/53.32; 192/53.1
(58) Field of Classification Search .............. 192/53.32; 74/345
See application file for complete search history.

(56) References Cited

U.S. PATENT DOCUMENTS

| 2,399,097 A | | 4/1946 | Carnagus | |
| 3,063,529 A | * | 11/1962 | Cook | 192/53.5 |
| 3,161,270 A | * | 12/1964 | Aschauer | 192/53.1 |
| 4,934,498 A | * | 6/1990 | Knowles | 192/18 A |

FOREIGN PATENT DOCUMENTS

| DE | 196 19 981 | | 11/1997 |
| EP | 0 331 362 | | 9/1989 |
| GB | 2 216 203 A | * | 10/1989 |

* cited by examiner

*Primary Examiner*—Rodney H Bonck
(74) *Attorney, Agent, or Firm*—Darby & Darby P.C.; John Tolomei

(57) ABSTRACT

A drive arrangement (1) is disclosed where a driving gear (13) is engageable with a shaft (14) by engaging an axially movable sleeve (19) with a dog (23). One of the sleeve (19) or dog (23) is drivably connected to the gear (13) and the other to the shaft (14). A piston (21) is engaged via fork (22) with the sleeve (19); axial movement of the piston (21) causes axial movement of the sleeve (19). A delay device is included which prevent engagement between the sleeve (19) and dog (23) until the rotational speeds of those elements is equalized. The delay device include a friction plates (24) which create a friction drive between the driving force (e.g. gear (13)) and the element to be driven. The friction drive is actuated by actuator (25) under the same compressed air supply that acts on piston (21). Torque acting between the friction plates (24) and sleeve (19) prevent the sleeve (19) from moving into engagement with the dog (23) before the speeds of the sleeve (19) and dog (23) have equalized.

26 Claims, 6 Drawing Sheets

US 7,497,311 B2

DRIVE ENGAGEMENT APPARATUS

CROSS REFERENCE TO RELATED APPLICATIONS

This is a U.S. national phase application under 35 U.S.C. § 371 of PCT International Patent Application No. PCT/GB2004/002496, filed 11 Jun. 2004, which claims priority to GB 0313497.0, filed 11 Jun. 2003. PCT International Patent Application No. PCT/GB2004/002496 was published in English as WO 2004/109137 A1 on 16 Dec. 2004 under PCT Article 21(2).

FIELD OF THE INVENTION

The invention described herein relates to engagement devices for enabling a rotating driving member to be brought into smooth positive engagement with a load to be driven by e.g. synchronising the driving member with a driven member. For example, the invention could be used in a type of clutch to smoothly engage a driving member with e.g. heavy duty equipment fitted to vehicles, e.g. fire engine pumps, road marking equipment, blowers, vacuum tankers, dynamos etc.

BACKGROUND TO THE INVENTION

A known clutch arrangement includes friction plates enclosed in a clutch housing. The friction plates are compressed mechanically or pneumatically by a circular piston pressing on a pressure plate, which comes into contact with the friction plates and pushes them together. An output shaft having the load to be driven attached to it, e.g. by a coupling, has alternate friction plates in mechanical cooperation with it. The other alternate friction plates (i.e. those not in cooperation with the output shaft) are in mechanical cooperation with a driving sleeve which rotates as part of the driving shaft. The clutch works by friction acting between the friction plates as they are pushed together.

This type of clutch relies on the constancy of e.g. operating fluid pressure and/or the load to be driven. In other words, the important factors affecting the effective operation this type of clutch are how much force can be applied by the piston to push the friction plates together, and how much load is attached to the output shaft to be driven. Obviously, a larger load has more inertia and is harder to start rotating. Larger forces, e.g. larger fluid pressures, are needed in this case. If demand on the clutch is raised beyond its capacity, the friction plates are likely to slip and overheat; the clutch will eventually fail by burning out.

Another example of a known clutch is shown in GB 2216203. The arrangement shown in this document has an internally splined driving sleeve movable under the action of a pneumatic ram to engage an output dog drivably connected to an output shaft—this engagement effectively makes the driving sleeve and output shaft a single mechanical member, thereby avoiding the dependence on operating air pressure. The ram has an actuating rod with a fork element attached to it, the fingers of the fork element engaging an annular groove in the outer surface of the driving sleeve. Thus, when compressed air acts on an end of the pneumatic ram, the actuating rod slides axially, moving the driving sleeve with it. The driving sleeve has a pressure plate located inside it and releasably engaged to it by means of steel balls resiliently urged into depressions formed in the inner surface of the sleeve. There are a set of friction plates, alternate ones of which are engaged with the internal splines of the driving sleeve, the remainder being engaged with the output shaft. When the sleeve is initially moved towards engagement with the output dog, the pressure plate moves axially with it and loads the friction plates against one another to begin turning the output shaft. A large torque is required to start the rotation because of the inertia of the load attached to the output shaft. This torque manifests itself as friction between the friction plates and the internal splines of the driving sleeve. This friction is enough to prevent further sliding motion of the driving sleeve until the rotational speeds of the driving sleeve and output shaft are more or less equal. The torque required to turn the output shaft is then less, so the friction acting on the splines of the driving sleeve is reduced and sliding recommences.

In this arrangement, the force that pushes the friction plates together originates from the compressed air acting on the pneumatic ram. Since the size of the ram is limited e.g. by the constraints of the size of the housing itself, the amount of force that can be generated is also limited. Furthermore, when large loads need to be started, the bending moment on the fork element deflects the line-ability of the clutch housing. As a result, the pneumatic ram is pulled out of alignment with the housing, which can wear the components. As more powerful machinery with larger loads that need to be driven is introduced, clutches of this type are struggling feasibly to provide enough force to overcome the initial inertia so as to enable engagement.

SUMMARY OF THE INVENTION

The present invention seeks to ameliorate at least some of the problems associated with known clutches. In particular, the clutch according to the present invention includes a piston valve which allows the configuration of the clutch to be altered so that it may be capable of overcoming the inertia of large loads.

At its most general, the present invention separates the functions of (i) engaging a driving member with a driven member, and (ii) activating a friction drive e.g. by pushing friction plates together, by incorporating a valve arrangement in the piston which allows a force to act through the piston without necessarily moving the driving member. Thus, these actions are separated without necessarily increasing the size of the housing or necessarily requiring further power supplies or input ports. As a result, the present invention provides a way of activating the friction drive with a larger force than before by using a actuator having a larger area, yet still being able to provide the system in a housing that is no larger than known housings. Furthermore, the clutch of the present invention is only used to synchronise the driving and driven members, thus it is less likely to burn out through overloading. The valve arrangement in the piston also allows an air controlled friction drive to be deactivated just before the moment of positive engagement of the clutch, so that engagement proceeds smoothly.

According to an aspect of the invention, there is provided an apparatus for engaging a rotary driving member with an element to be driven, the apparatus including a housing containing: a first rotatable member capable of being axially moved into positive engagement with a second rotatable member, one of the first or the second rotatable members being drivably connected to the rotary driving member and the other of the first or the second rotatable members being drivably connected to the element to be driven such that positive engagement between the first and second rotatable members effects engagement of the rotary driving member with the element to be driven; a piston slidably mounted in the housing, the piston being operably connected with the first rotatable member such that pressure acting on one end of the piston effects axial movement of the piston with respect to the housing, thereby effecting axial movement of the first rotatable member; and a delay device for delaying the establishment of a positive connection between the first and second rotatable members, the delay device having: means for producing a friction drive between the first and second rotatable members to cause rotation of the rotatable member that is drivably connected to the element to be driven prior to engagement of the first and second rotatable members; and a friction drive actuator, the actuator being axially movable to activate the friction drive; wherein the piston has a passageway through it such that pressure acting on the end of the piston also acts on the friction drive actuator to effect movement of it.

The axially movable first rotatable member may be drivably connected to the rotary driving member and the second rotatable member is drivably connected to the element to be driven.

Alternatively, the second rotatable member may be drivably connected to the rotary driving member and the axially movable first rotatable member is drivably connected to the element to be driven.

Thus, the passageway through the piston allows the friction drive to be activated by the friction drive actuator acting separately from the movement of a driving element (i.e. the first or second rotatable member) which is drivably connected to the rotary driving member. The piston acts as a valve arrangement which partitions a single pressure to move both the driving element and the actuator. In other words, only a single input of e.g. compressed air may be required push the actuator and move the driving element.

Preferably, the apparatus includes restraining means to restrict initial axial movement of the piston, thereby allowing pressure to act firstly on the friction drive actuator. Preferably, the restraining means is a spring.

Preferably, the first rotatable member moves in a first direction into positive engagement with the second rotatable member; the friction drive actuator moves in a second direction to activate the friction drive; and the first direction is substantially opposite the second direction.

Preferably, the piston includes a first end portion and a second end portion, each end portion being slidably received in a respective first and second cylinder formed in opposite ends of the housing, the arrangement being such that pressure acting on the first end portion axially moves the piston so as to effect engagement of the first rotatable member to the second rotatable member, and pressure acting on the second end portion axially moves the piston so as to effect disengagement of the same.

Preferably, the passageway extends through the piston between the first cylinder and the second cylinder. Preferably, the passageway opens into the second cylinder via a radial hole in the piston, such that pressure from the passageway acts on the side of the second cylinder. Fluid (e.g. compressed gas, preferably compressed air) communication means may then be provided between the friction drive actuator and the side of the second cylinder so that pressure acting on the side of the second cylinder also acts the friction drive actuator. The remainder of the specification refers to compressed air, but the present invention may work with any other type of fluid. Preferably, the compressed air communication means includes a bore through the housing.

Preferably, sealing means are located around the piston at a predetermined axial distance from each side of the radial hole, the sealing means defining a zone in which pressure from the passageway acts. Preferably, the sealing means are sealing rings positioned around the piston. The sealing rings are preferably positioned such that the zone is isolated from the compressed air communication means when the piston has moved the first rotatable member a predetermined distance towards engagement with the second rotatable member. Thus, one of the sealing rings may move over the bore in the housing as the first rotatable member moves into engagement with the second rotatable member, thereby releasing pressure from the cylinder. The piston may include a race to release air into the housing space when the zone is isolated from the bore in the housing. Preferably, therefore, the pressure ceases to act on the friction drive actuator just before or at the same time as positive engagement is established between the first and second rotatable members. Thus, the apparatus may disengage the friction drive just before or at the same time as positive engagement is established between the rotary driving member and the driven member. This is achieved by selecting the positions of the sealing means carefully so that the friction drive actuator is isolated from the pressure acting on it at the relevant moment, e.g. when the first rotatable member begins to slide into full engagement with the second rotatable member. Thus, at the point of direct mechanical connection, the clutch will be free from any load contact, so any load or speed fluctuations at that point will not affect the clutch.

Preferably, the friction drive actuator is biased away from activating the friction drive. It may be biased by a spring.

Preferably, the friction drive actuator includes an annular pressure ring slidably mounted in the housing. The area of the annular pressure ring on which the pressure acts may be greater than the area of the piston on which pressure acts. There is less restriction on space in the opposite side of the housing from the driving member, therefore the actuator may be larger. The advantage of having a large actuator is that e.g. compressed air can act on a larger area than e.g. the end of the pneumatic ram (which was the area acted on in known clutches). Thus, a larger force for a given pressure can be obtained.

Preferably, the means for producing a friction drive include a plurality of axially movable friction plates, a first set of which are rotatably engaged with the first rotatable member and a second set of which are rotatably engaged with the second rotatable member, the plurality of friction plates being arranged so that they first and second set are pushed together by the friction drive actuator. Each friction plate of the first set may be provided between friction plates of the second set.

Preferably, the second rotatable member includes a gear mounted on a shaft, the gear being engagable with the first rotatable member to effect the positive engagement between the first and second rotatable members. The gear mounted on the shaft may be axially movable, and the friction drive actuator may be arranged to act on the gear to push it to activate the friction drive. The first rotatable member may include a sleeve coaxial with the shaft, the sleeve being engagable with the gear. In this case, the piston may include a fork member with fingers that engage a groove in the outer surface of the sleeve.

Preferably, the pressure is provided by compressed air. Preferably, the pressure provided to the system is 120 psi (approximately $8 \times 10^5$ Pa). However, the pressures required depend on the starting torque needed to turn the driven member. Preferably, the pressure provided to the system is variable to cope with the requirements of different loads.

Preferably, the apparatus includes means for applying a first force to activate the friction drive, wherein the means is arranged so that the first force activating the friction drive is greater than a second force acting on the first rotatable member. Preferably, the first and second forces are derived from a given pressure acting on different areas.

Preferably, the apparatus includes power means for providing pressure from which a force to effect movement of the driving member and the driven member in the first and second directions respectively can be derived.

In another aspect of the invention, there is provided an apparatus for engaging a rotary driving member with an element to be driven, the apparatus including: a first rotatable member capable of being axially moved in a first direction into positive engagement with a second rotatable member, one of the first or second rotatable members being drivably connect to the rotary driving member, and the other rotatable member being drivably connected to the element to be driven; and a delay device for delaying the establishment of a positive connection between the first and second rotatable members, the delay device having: means for producing a friction drive to rotate the rotatable member drivably connected to the element to be driven prior to engagement with the other rotatable member; and a friction drive actuator, the actuator being axially movable in a second direction to activate the friction drive, the second direction being substantially opposite the first direction; wherein, when the friction drive is initially activated, axial movement of the first rotatable member in the first direction is delayed until the torque required to rotate the second rotatable member and element to be driven has lessened.

BRIEF DESCRIPTION OF THE DRAWINGS

Examples of the present invention will now be described in detail with reference to the accompanying drawings, in which.

DETAILED DESCRIPTION; FURTHER OPTIONS AND PREFERENCES

Figure 1:
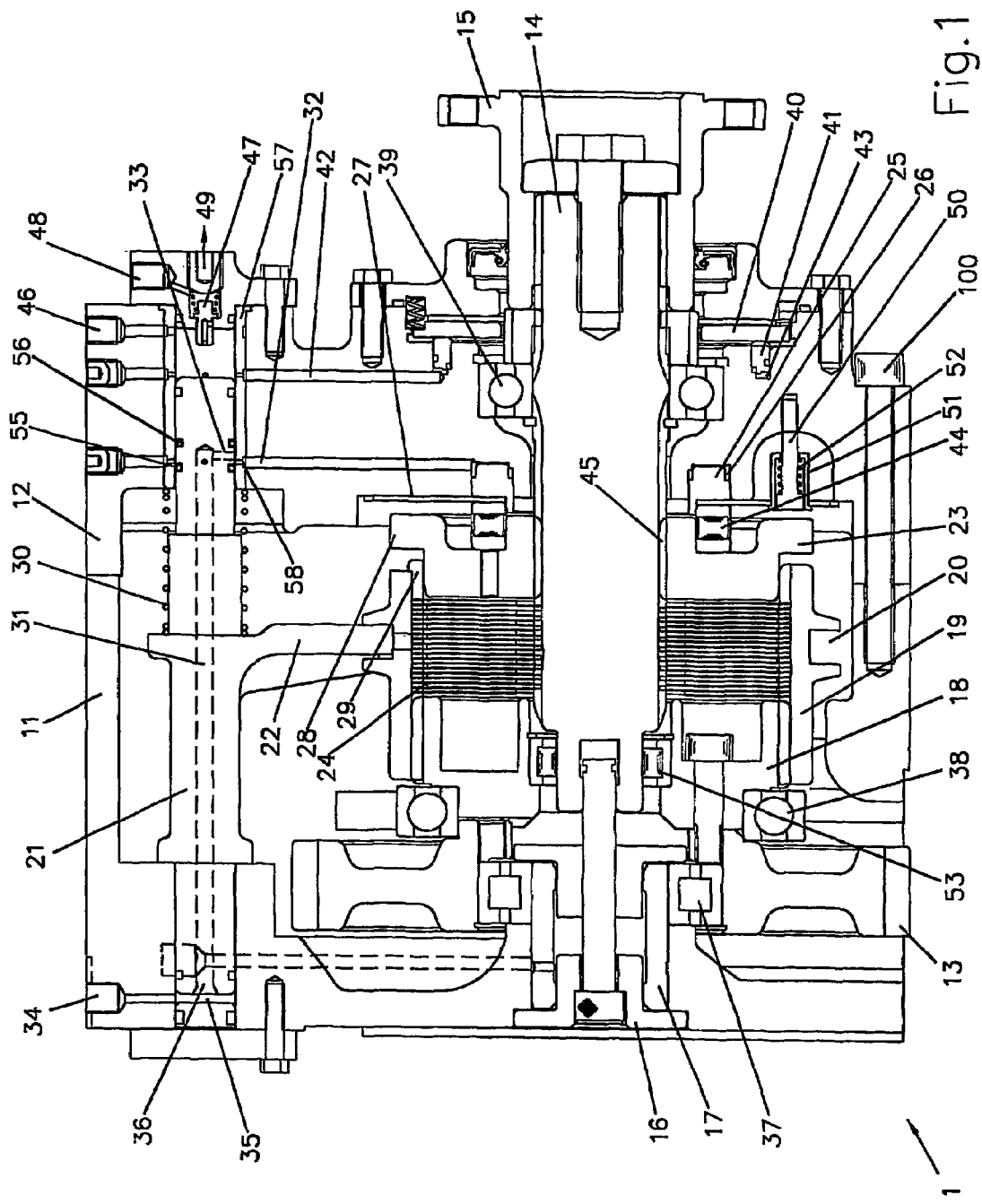
FIG. 1 is a cross section of a drive arrangement which is a first embodiment of the invention.

A first embodiment of the drive arrangement 1 of the invention shown in FIG. 1 has a housing consisting of two parts 11, 12 fixed together using e.g. bolt 100. The housing defines a space in which the mechanism of the invention is located. A driving gear 13 is rotatably mounted in the housing by means of roller bearing 37, which is located on shaft 17 fixed to stub 16 on the end wall of the housing. Driving gear 13 is externally splined to be permanently engaged to a rotating member (not shown) of an engine. Thus, when the engine is running, driving gear 13 rotates. Extension member 18 is bolted to driving gear 13 to rotate with it. Extension member 18 is splined around its external surface. Driving sleeve 19 is internally splined, and is keyed into axially slidable engagement with the extension member 18, so that it rotates with the driving gear 13 but is axially slidable relative to the extension member 18.

The housing also holds output shaft 14 via roller bearing 39. One end of the output shaft 14 extends through the centre of driving sleeve 19 into extension member 18, where it is located in a roller bearing 53, which allows independent rotation of the shaft 14 and extension member 18. The other end of the shaft 14 has coupling 15 attached to it by means of which the drive arrangement can be attached to an external device (e.g. centrifugal fire engine pump), which needs to be driven.

Driving sleeve 19 is axially movable by piston 21, which has a fork member 22 that engages an annular groove in the surface of the driving sleeve 19. Thus, when compressed air is supplied through input port 34 to space 35, piston 21 is pushed to the right as shown in FIG. 1; this would serve also to push the driving sleeve 19 to the right.

Output shaft 14 is externally splined, and output dog 23 is slidably keyed via internal splines on to it. Output dog 23 and driving sleeve 19 are arranged so that they can be drivably connected to one another via a dog tooth connection 28, 29. In other words, driving sleeve 19 can be pushed into engagement with output dog 23 to effect mechanical connection between the driving gear 13 and output shaft 14.

If the driving sleeve 19 were pushed into immediate engagement with the output dog 23, the inertia of the load connected to the output shaft 14 would give the system a large shock, which could easily damage components. It is better for the output shaft 14 (and therefore the output dog 23) to be already rotating at a similar (if not the same) speed as the driving sleeve 19 when engagement occurs, to minimise any shock loading. To delay the moment of engagement, friction plates 24 are provided between the extension member 18 and the output dog 23. Alternate ones of the friction plates have internal splines which engage on the external splines of output shaft 14, therefore rotate with that shaft. The other alternate friction plates have external splines that engage with the internal splines of the driving sleeve 19; the friction plates 24 are able to slide axially relative to one another.

When the piston 21 is in the leftmost position in FIG. 1 (i.e. disengaged or 'parked'), there is a gap of about 3 mm to 5 mm between the output dog 23 and the extension member 18 so that there is about 1 mm free play between the friction plates 24. Thus, when the friction plates are not in use, the two sets of plates can rotate relative to one another relatively easily.

On the opposite side of the output dog 23 from the friction plates 24, there is a annular ring 25 mounted in a cylinder 26. The ring 25 has a pressure plate 27 attached to it which engages the output dog 23 via roller bearing 44. The arrangement is such that when e.g. compressed air is provided in the cylinder 26, the ring is pushed to the left as seen in FIG. 1. Thus, the pressure plate 27 pushes the output dog 23 via thrust bearing 44 to the left; the output dog 23 pushes the friction plates 24 together, squeezing them between the output dog 23 and the extension member 18, thereby activating a friction drive on the output shaft. This will be explained in more detail below.

Fluid (e.g. compressed air) is provided to the cylinder 26 by a bore 32 drilled in the housing. The compressed air for moving the ring 25 comes from the same port 34 as the compressed air for moving piston 21. The piston 21 has a passageway 31 drilled in it which has a port 36 at one end that opens into space 35. At the other end, a radial hole 33 links the passageway 31 to bore 32, i.e. it allows compressed air communication between the port 34 and cylinder 26.

Figure 2:
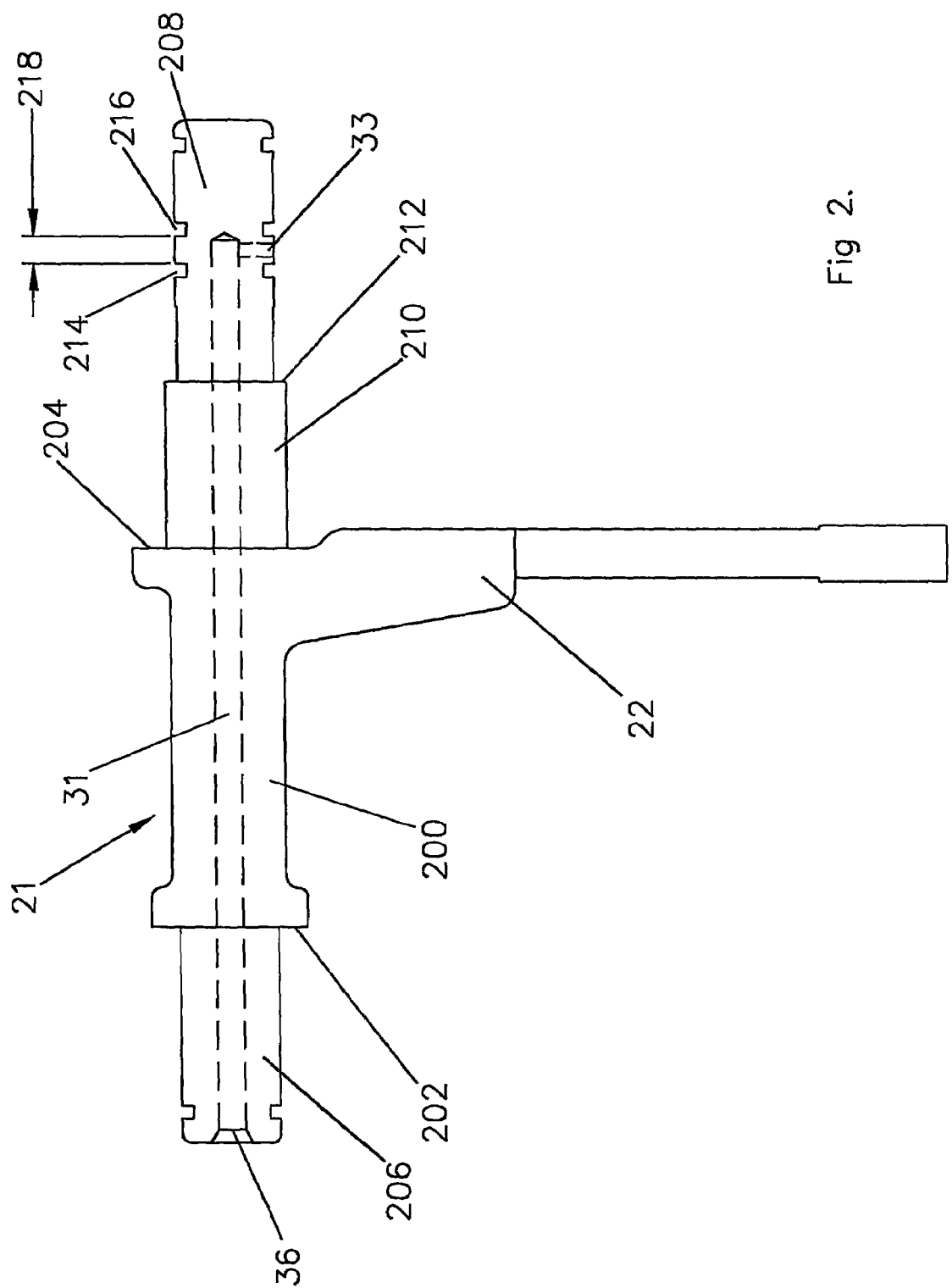
FIG. 2 shows the selector fork of the drive arrangement of FIG. 1.

Piston 21 is shown on its own in FIG. 2. It has a cylindrical rod as an upper body from which depends the fork member 22. Such an arrangement is well known. The cylindrical rod is formed of a number of portions of different diameters. The central portion 200 has the largest diameter and holds the fork member 22. End portions 206, 208 are of a smaller diameter and are slidably received in cylinders formed in the housing of the drive arrangement as shown in FIG. 1. End portion 206 is located in the end of the housing having the port 34. An end surface 202 of the centre portion abuts the housing to limit the extent to which the piston 21 can move to the left in FIG. 1 (i.e. out of engagement). The other end portion 208 is received in a cylinder in the other side of the housing. End portion 208 is connected to centre portion 200 by intermediate portion 210. The intermediate portion has a surface 212 which abuts the housing at the entrance to the cylinder for receiving end portion 208 to limit the movement of the piston 21 to the right in FIG. 1 (i.e. into engagement). As shown in FIG. 1, the intermediate portion 210 has a coiled spring 30 fitted around it that pushes against the wall of the housing and surface 204 of the centre portion, i.e. it acts to push the piston 21 to the left in FIG. 1, i.e. it acts to stop driving sleeve 19 from being pushed immediately into engagement with output dog 23. In fact, the spring is of a particular biasing strength so that, when e.g. compressed air is provided from port 34 to space 35, travel of the piston 21 is restricted enough by the spring so that the compressed air communicates first with the ring 25 and therefore acts on the output dog 23 first. In other words, the spring 30 ensures that the friction drive on the output shaft is initiated by movement of the output dog 23 before the driving sleeve 19 moves significantly.

End portion 208 also includes annular grooves 214, 216 located on either side of the radial hole 33. The grooves 214, 216 are for locating sealing rings 55, 56 to define a zone 218 around the end portion 208 when it is located in the cylinder in the housing in which the pressure from radial hole 33 can act. Thus, the piston 21 itself can act as a valve for the pressure acting through the passageway 31. When the zone 218 is positioned over the bore 32, the pressure through the passageway 31 can act on the ring 25, whereas if the piston 21 is moves axially so that one of the sealing rings 55, 56 moves over the entrance to the bore 32, the ring 25 will be isolated from the pressure.

FIG. 1 shows the arrangement in a disengaged position. Piston 21 is at its leftmost position. Output shaft 14 is thus not driven. To move to an engaged state, compressed air is provided into space 35 via port 34. The spring 30 restricts the movement of the piston 21 under this pressure, such that the pressure acts first on ring 25 in cylinder 26 via passageway 31 and radial hole 33 and bore 32. The ring 25 pushes pressure plate 27 against output dog 23, which slides so as to push the friction plates 24 together. This movement is relatively small: the output dog 23 is unable to slide into engagement with the drive sleeve 19; the sleeve itself must move to effect engagement. Friction between the alternate plates that rotate with the sleeve and the plates engaged with the output shaft 14 makes the shaft 14 start to turn. However, the torque required for this means high contact pressures act against the side surfaces of the internal splines of the driving sleeve 19 which prevent it from moving to the right (i.e. to engage with the output dog 23). However, as the output shaft 14 increases in speed, the torque required lessens so that the contact pressures reduce to allow the pneumatic force on the driving sleeve 19 to overcome the restraining force of the spring 30 so that it begins to slide into full engagement with output dog 23. The pneumatic force through radial hole 33 acts from zone 218 defined by sealing rings 55, 56 located in grooves 214, 216. Zone 218 is so positioned such that as the driving sleeve 19 begins to slide into full engagement with the output dog 23, the compressed air supply to cylinder 26 is cut off. To effect release of pressure from the piston 25 (and therefore output dog 23) before the point of engagement, a race is provided in the piston to allow the compressed gas to communicate with the housing space via bore 32.

End portion 208 is slidably received in valve sleeve 57. The valve sleeve 57 includes a number (preferably five) radial holes 58 of e.g. 1 mm diameter which communicates via a cylindrical channel with the bore 32 in the housing. The compressed air supply to the cylinder is cut off when one of the sealing rings 55, 56 moves over it so that it is isolated from zone 218. The release of compressed air allows the piston 21 to overcome more easily the restraining force of the spring 30 and therefore the mechanical coupling between the sleeve 19 and the output dog 23 is made easily.

Pressure plate 27 has a pull-back mechanism where it (and ring 25) are urged fully back into the cylinder 26 when pressure is removed. The pull-back mechanism has a bolt 50 fixed in a recess relative to the side of the housing containing the cylinder 26. The bolt has a cylinder 51 slidably mounted on it and biased away from it (to the right in FIG. 1) by a spring 52. Cylinder 51 is attached to pressure plate 27 such that it acts to pull the plate towards the housing.

The drive arrangement also includes means for braking the output shaft 14 when the driving sleeve 19 is disengaged from the output dog 23. A braking plate 40 has internal splines which engage the external splines of the output shaft 14 so that the braking plate 40 rotates with the shaft 14. A circular piston 41 is mounted in a cylinder 43 such that when e.g. compressed air is provided via bore 42 in the housing, the piston 41 frictionally acts against the braking plate 40 to effect braking of the output shaft 14. Bore 42 opens into the slot for receiving end portion 208 of the piston 21. The entrance to the bore is positioned so that compressed air can only gain access to the cylinder 43 when the piston 21 has moved sufficiently enough to the left (i.e. in the direction of disengagement) to make sure the driving sleeve 19 and output dog 23 are disengaged.

To move the piston 21 to the left when the system is engaged, i.e. to disengage the arrangement, the compressed air supply is switched from port 34 to port 46. The position of bore 42 means that the same input for compressed air to disengage the drive can be used to activate the braking system.

At the end of the cylinder for receiving end portion 208 of the piston 21, an indicator valve is located. The valve may be connected to a rotawink indicator or the like. When the drive is in its disengaged, or 'parked' position, the compressed air supply is applied to port 46 of the housing to maintain the parked position and 'charge up' the indicator with compressed air. When the line to the indicator is charged up, the indicator changes colour to demonstrate to an operator what state the system is in. When the piston 21 completes its final move to engage the driving sleeve 19 with the output dog 23, the end of the piston pushes the valve 47 off its seat, which releases the compressed air that was charging up the indicator to the atmosphere, thereby causing the indicator to change colour to designate that the system is fully engaged.

Figure 3:
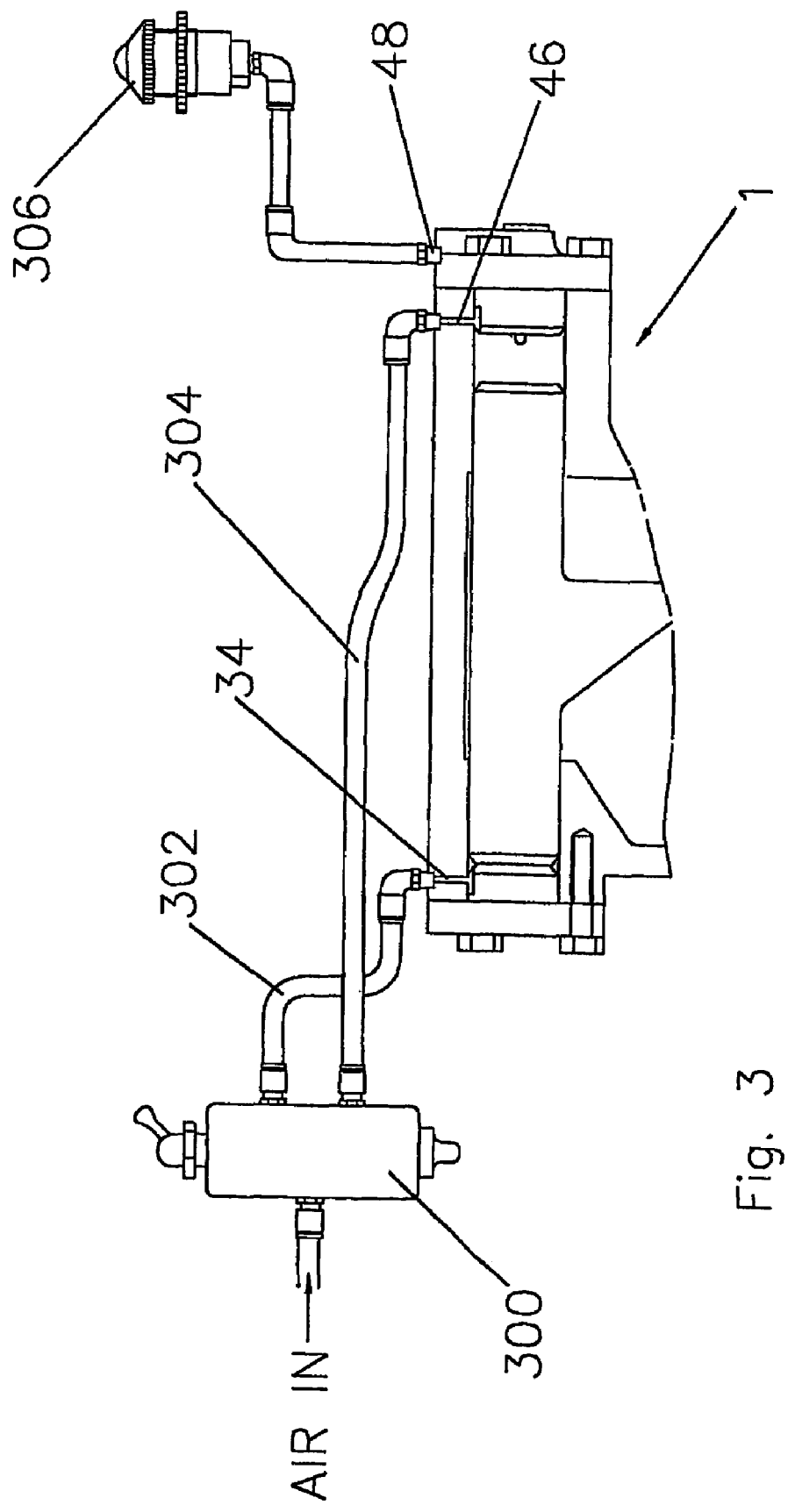
FIG. 3 is a piping diagram showing the layout of the compressed air supply to the drive arrangement of FIG. 1.

FIG. 3 shows the piping arrangement for the system. Compressed air under pressure is supplied to operating switch 300, which has connections 302, 304 to the drive arrangement 1. When the drive is disengaged, compressed air is supplied to port 46 via pipe 304. To engage the drive, the switch 300 is flicked and compressed air is provided to port 34 via pipe 302. The rotawink indicator 306 is usually mounted in e.g. a driver's cab or near the operator to warn the operator of the state of the arrangement.

Figure 4:
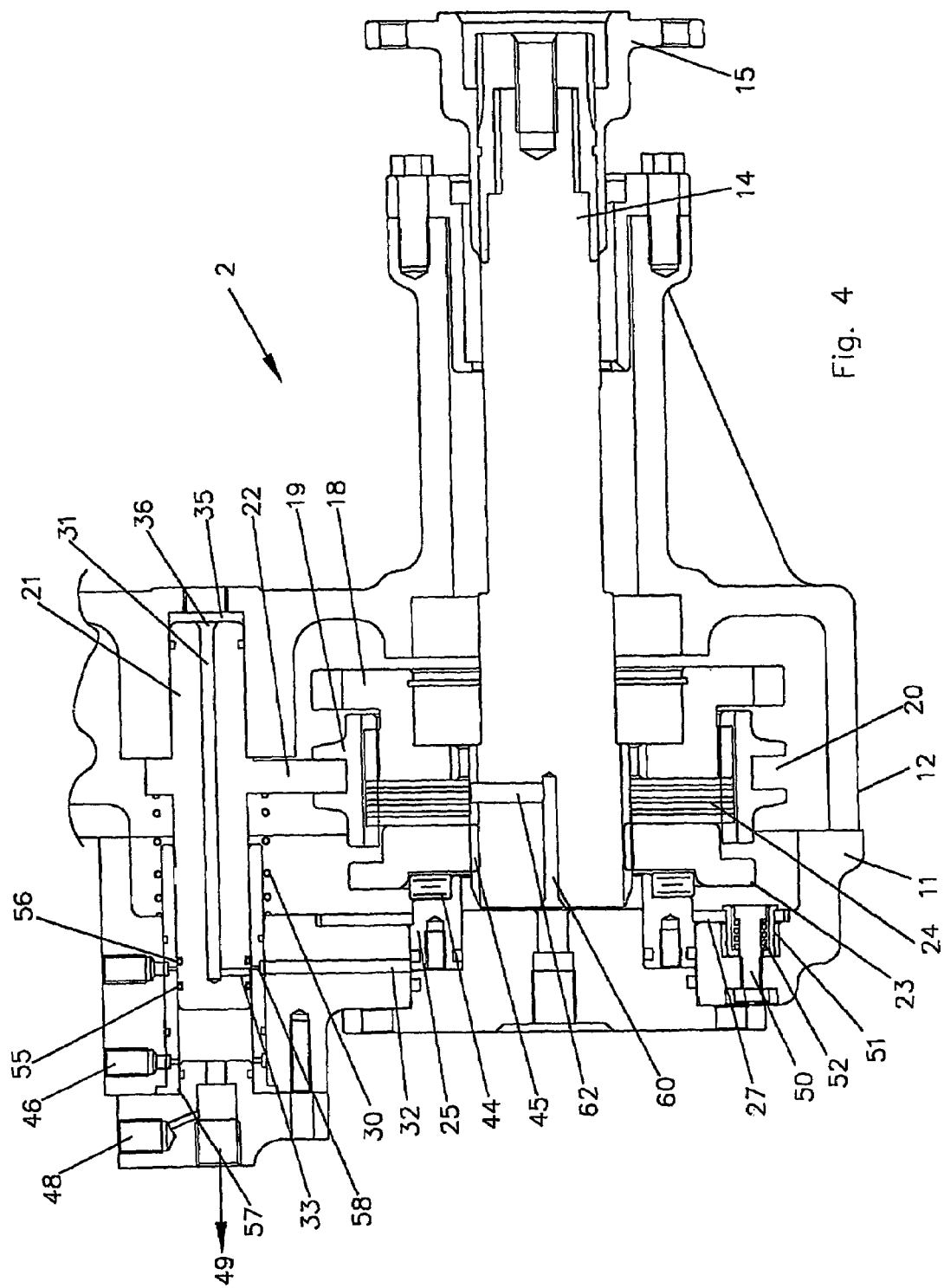
FIG. 4 is a cross section of a drive arrangement which is a second embodiment of the invention.

FIG. 4 shows a drive arrangement 2 which is a second embodiment of the invention. It has many components in common with the arrangement shown in FIG. 1, and these components are labeled with the same reference number.

The drive arrangement shown in FIG. 4 is for smaller loads than the arrangement shown in FIG. 1. In FIG. 1, the axis of rotation of the output shaft 14 was aligned with the drive axis (i.e. the axis of rotation of the driving gear 13). In FIG. 4, the axis of rotation of the output shaft 14 makes an angle with drive axis.

Furthermore, the direction of the sleeve's 19 slide into engagement with the output dog 23 with opposite to that of the arrangement shown in FIG. 1. In FIG. 4, the sleeve 19 slides away from the element to be driven (not shown) which is attached to the output shaft 14 by the coupling 15. Thus, the piston arrangement is reversed with respect to the output shaft. The space 35 for receiving input compressed gas to move the piston 21 is now in the same housing part 12 that supports the output shaft 14. The port 36 for allowing communication of the compressed gas with the ring 25 via the axial passageway 31 and the radial hole 33 in the piston 21 and the radial hole(s) 58 in the valve sleeve 57 and bore 32 in the housing part 11.

The drive arrangement 2 in FIG. 4 operates in the same way as the drive arrangement in FIG. 1. Extension member 18 is in permanent engagement with a rotating member of an engine (not shown). As before, the extension member 18 and sleeve 19 are externally and internally splined respectively, and the sleeve is keyed into axially slidable engagement with the extension member 18. Thus, the sleeve 19 rotates with the extension member 18.

A set of friction plates 24 are axially slidably engaged with the internal splines of the sleeve 19. These plates are interposed by another set of friction plates which are axially slidably engaged with external splines on the output shaft 14. The friction drive is actuated when both sets of friction plates are pressed together. A passageway 60 and radial hole 62 are provided in the output shaft to enable lubricant (e.g. oil) to be delivered to the friction plates.

To activates the friction drive, pressure (e.g. compressed air) is applied in the space 35. Due to the effect of the restraining spring 30 and torque of the friction plates 24 on the internal splines of the sleeve 19, the piston 21 does not make any initial axial movement. Instead, the compressed air acts on the ring 25 to push output dog 23, which is axially slidably engaged with external splines 45 of the output shaft 14, via roller bearing 44. The output dog 23 slides axially towards the friction plates 24, and presses them together to activate the friction drive, i.e. to initiate rotation of the shaft 14. As the rotational speeds of the shaft 14 and sleeve 19 equalize, the torque exerts on the internal splines of the sleeve 19 by the friction plates 24 lessens, which allows the piston 21 to move axially, thereby bringing the sleeve 19 into positive engagement with the output dog 23.

As the piston 21 moves axially, sealing ring (e.g. o-ring) 56 moves over the radial hole(s) 58 to stop the compressed air from reaching the ring 25. The ring 25 is then pulled away from the output dog 23 by pressure plate 27, which acts under the influence of spring 52 contained between bolt 50 and cylinder 51 as in FIG. 1. The friction drive is therefore deactivated at the point of engagement between the sleeve 19 and output dog 23.

Figure 5B:
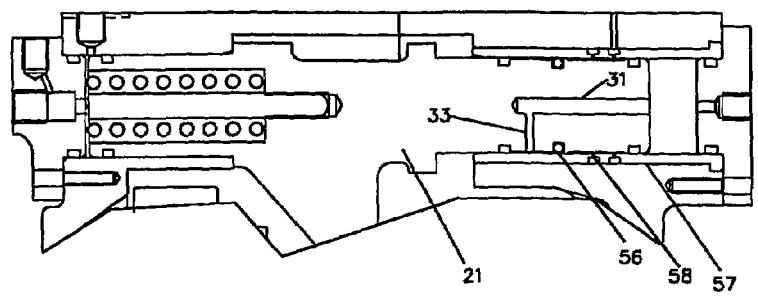
FIG. 5b shows the top part of the drive arrangement of FIG. 5a in an engaged position.
Figure 5A:
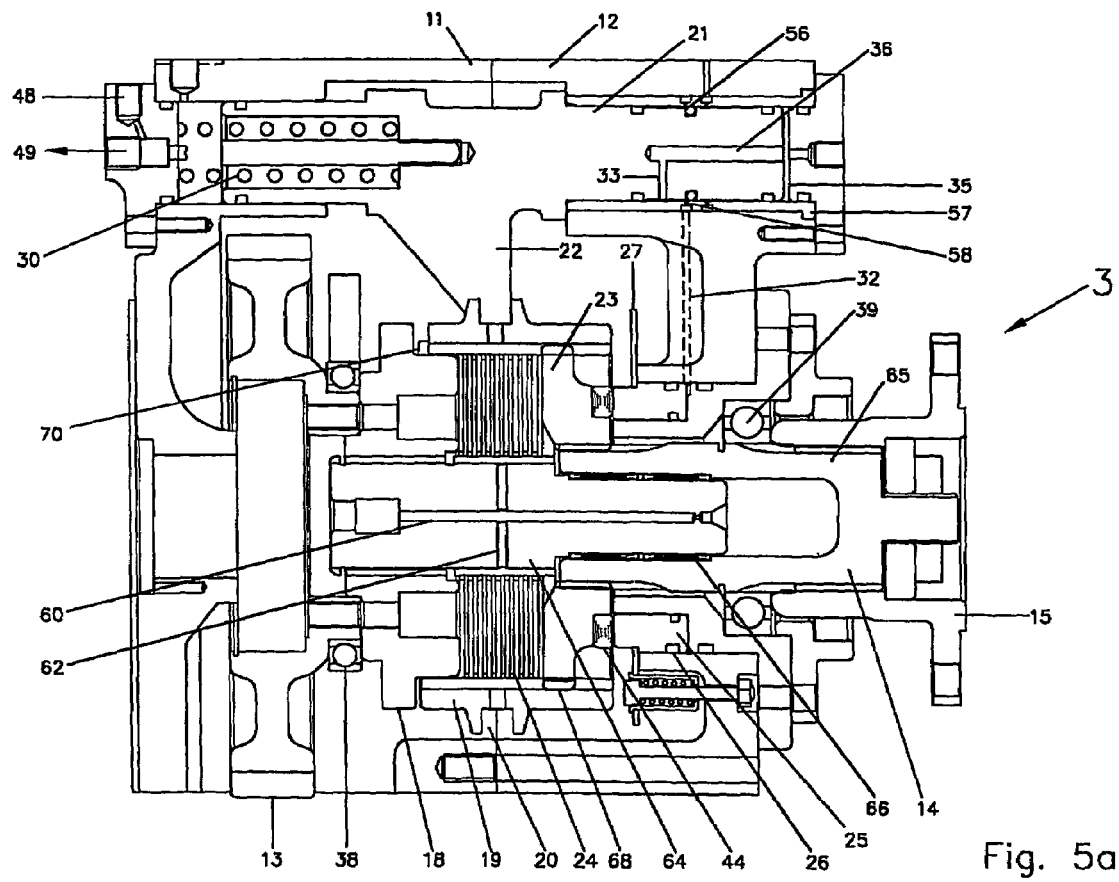
FIG. 5a is a cross section of a drive arrangement which is a third embodiment of the invention, shown in a disengaged position.

FIG. 5a shows a drive arrangement 3 which is a third embodiment of the invention. Like FIG. 1, the drive arrangement 3 shown in FIG. 5a is of the type where the rotation axis of the shaft 14 is aligned with the rotation axis of the driving gear 13. One difference between the drive arrangements of FIGS. 1 and 5a is the direction of axial movement of the sleeve to effect positive drive engagement. Unlike FIG. 1, in FIG. 5a, the sleeve 19 is not keyed into the extension member 18 and therefore does not rotate with the engine. Thus, when the drive arrangement 3 is in the disengaged position (shown in FIG. 5a), the sleeve 19 is at rest. This means that the friction plates 24 that are engaged with the sleeve are also at rest. In order to activate a friction drive, it is therefore necessary that the friction plates that are engaged with the shaft 14 rotate with the driving gear 13. To achieve this, the shaft 14 includes a driven part 64 that is drivably connected to and rotates with the extension member 18, and an output part 65 that is connected to the element to be driven (not shown) by a coupling 15. The driven part 64 of the shaft 14 lies partially within the output part 65 and they can move relative to one another on needle bearings 66. The output part 65 has output dog 23 keyed on to its external splines. The sleeve 19 is engaged with the output dog 23, so rotation of the sleeve 19 will cause rotation of the output part 65 of the shaft 14.

The drive arrangement 3 is arranged to operate so that the friction drive is actuated by the output dog 23 pressing the two sets of friction plates 24 together to 10 start the sleeve 19 (and the output part 65 of the shaft) rotating. When the rotational speed of the sleeve 19 and the driven gear equalises, the sleeve 19 axially slides into engagement with the extension member 18 effectively to form a solid drive connection between the driving gear 13 and the output shaft 14. The sleeve 19 has axial splines 70 for engaging the extension member 18.

This alternative engagement arrangement means that the piston 21 is moved in the opposite direction relative to the output shaft 14 from the arrangement in FIG. 1. Thus, compressed air is supplied into the space 35 at the end of cylinder 57, where it acts on ring 25 via passageway 31 and radial hole 33 in the piston 21, radial hole(s) 58 in the outer wall of cylinder 57, and bore 32 in the housing part 12.

FIG. 5b shows the top part of the drive arrangement 3 in the engaged position. By comparing FIGS. 5a and 5b, the motion of the sealing ring (o-ring) 56 over the radial hole(s) 58 to deactivate the friction drive at the point of engagement can be clearly seen.

The drive arrangement 3 shown in FIGS. 5a and 5b has a further advantage which comes about because the direction in which the ring 25 moves to activate the friction drive is the same as the direction in which the sleeve 19 moves into positive engagement with the extension member 18. The advantage is that a single position of the sealing ring 56 on the piston 21 works vis-à-vis deactivating the friction drive for all conditions of the friction plates (i.e. even when they are significantly worn away). This is in contrast to known arrangements, where the friction drive actuator had only a limited range of movement, so that once the friction plates had worn, the friction drive actuator was either unable to press them together or was unable to move further without causing interference between the sleeve and the output dog (see e.g. FIG. 1). The drive arrangement 3 of FIGS. 5a and 5b therefore increases the lifetime of the apparatus.

Figure 6B:
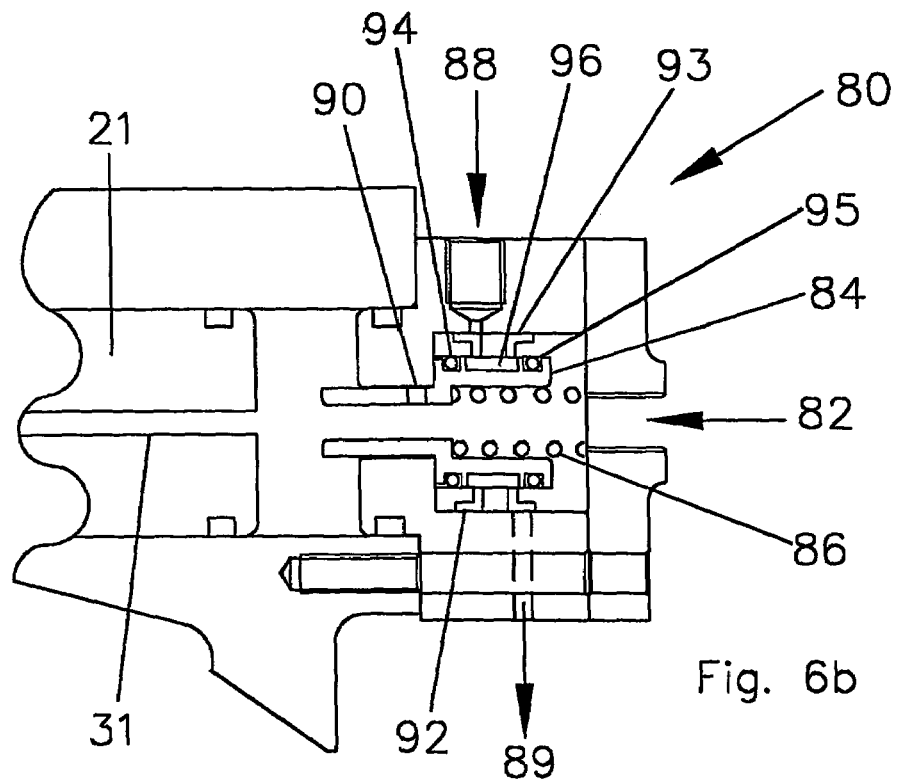
FIGS. 6a and 6b show a valve attachment for the air input of the drive arrangement of FIG. 5 in a disengaged and engaged configuration respectively.
Figure 6A:
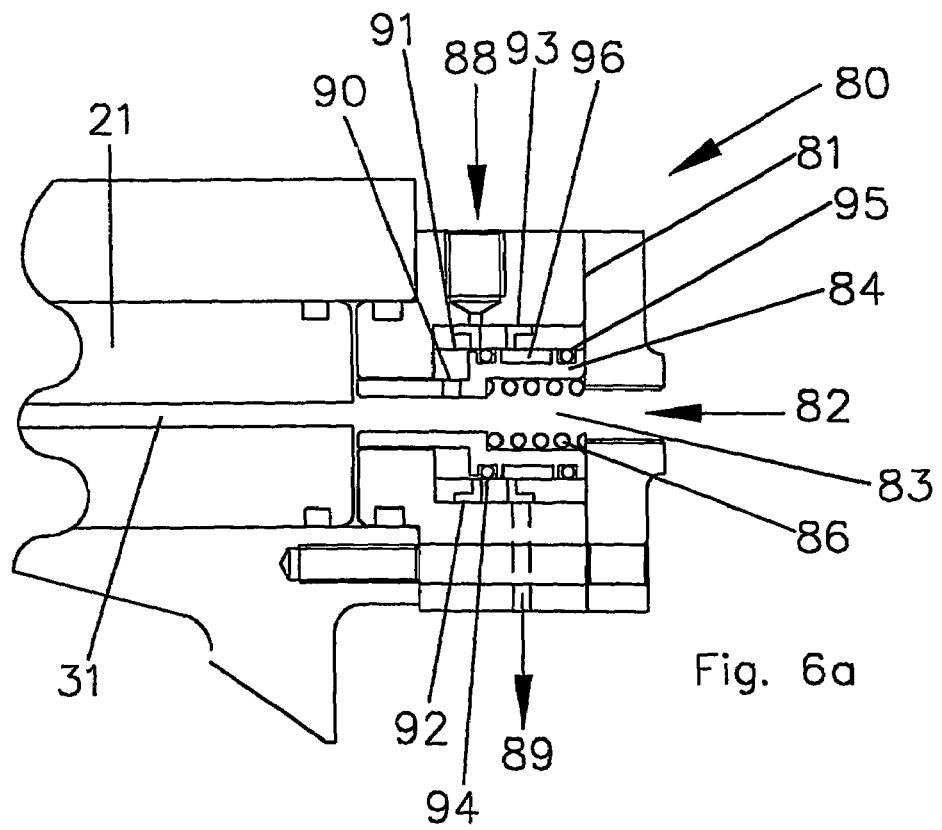

FIGS. 6a and 6b show a valve 80 which allows more effective engagement of the clutch. The valve 80 is positioned at the entrance 36 to the passageway 31 in the piston 21. The valve 80 comprises a housing 81 which has a main air input port 82, a piston input port 88 and an output port 89 providing fluid communication between the outside an a recess provided inside the housing 81. A valve piston 84 with an axial through hole 83 is axially slidably mounted in the recess in the housing 81. The axial through hole 83 is aligned with the main air input port 82 and the passageway 31 in the piston 21 so that compressed air applied through the main air input port 82 acts on the piston ring 25 via the passageway 31 to activate the friction drive as explained in detail above.

A spring 86 is mounted in the housing 88 to bias the valve piston 84 towards the piston 21. In the disengaged configuration (FIG. 6a), the valve piston 84 is prevented from axially sliding because its inner edge abuts the piston 21, which cannot axially move because of the torque of the friction drive. Compressed air is also applied through the piston input port 88. This pressure also acts on the piston ring 25 through annular passage 92, a gap 91 between the valve piston 84 and housing 81, and a radial bore 90 in the valve piston 84.

When the friction drive has equalized the speeds between the sleeve 19 and the extension member 18, the piston 21 slides into engagement as explained above. When the piston 21 slides away from the valve 80, the spring 86 urges the valve piston 84 axially away from the main air input port 82. This motion causes the radial bore 90 to become isolated from the piston input port by sliding into a constricted region of the housing 81. Furthermore, one 94 of a pair of o-rings 94, 95, which define therebetween an annular passage 96 on the valve piston 84, passes over the entrance of the annular passage 92 so that compressed air from the piston input valve is vented through the output port 89 via the annular passage 96 and a further annular passage 93 in the housing 81.

Valve 80 therefore allows additional compressed air to be provided to activate the friction drive in the disengaged configuration. The additional pressure is switched off by the valve at a predetermined distance of axial movement of the piston 21. In other words, the valve allows for deactivation of pressure acting on the piston ring 25 from the piston input port 88 at a preset clearance between the output dog 23 and sleeve 19.

The invention may include any variations, modifications or alternative applications of the above embodiment, as would be readily apparent to the skilled person without departing from the scope of the present invention in any of its aspects.

The invention claimed is:

1. An apparatus for engaging a rotary driving member with an element to be driven, the apparatus including a housing containing:
   a first rotatable member capable of being axially moved into positive engagement with a second rotatable member, one of the first or the second rotatable members being drivably connected to the rotary driving member and the other of the first or the second rotatable members being drivably connected to the element to be driven such that positive engagement between the first and second rotatable members effects engagement of the rotary driving member with the element to be driven;
   a piston slidably mounted in the housing, the piston being operably connected with the first rotatable member such that pressure acting on one end of the piston effects axial movement of the piston with respect to the housing, thereby effecting axial movement of the first rotatable member; and
   a delay device for delaying the establishment of a positive connection between the first and second rotatable members, the delay device having:
   means for producing a friction drive between the first and second rotatable members to cause rotation of the rotatable member that is drivably connected to the element to be driven prior to engagement of the first and second rotatable members;
   and a friction drive actuator, the actuator being axially movable to activate the friction drive;
   wherein the piston has a passageway through it for transmitting pressure acting on the end of the piston through the piston to the friction drive actuator such that the pressure acting on the end of the piston also acts on the friction drive actuator to effect movement of it.

2. An apparatus according to claim 1, wherein the axially movable first rotatable member is drivably connected to the rotary driving member and the second rotatable member is drivably connected to the element to be driven.

3. An apparatus according to claim 1, wherein the second rotatable member is drivably connected to the rotary driving member and the axially movable first rotatable member is drivably connected to the element to be driven.

4. An apparatus according to claim 1, having restraining means to restrict initial axial movement of the piston, such that pressure acting on the piston produces movement of the friction drive actuator prior to movement of the piston.

5. An apparatus according to claim 4, wherein the restraining means is a spring.

6. An apparatus according to claim 1, wherein
   the first rotatable member moves in a first direction into positive engagement with the second rotatable member;
   the friction drive actuator moves in a second direction to activate the friction drive; and
   the first direction is substantially opposite the second direction.

7. An apparatus according to claim 6, wherein
   the piston includes a first end portion and a second end portion, each end portion being slidably received in a respective first and second cylinders formed in opposite ends of the housing;
   the passageway opens into one of the cylinders via a radial hole in the piston, such that pressure from the passageway acts on the side of that cylinder; and
   fluid communication means are provided between the friction drive actuator and the side of the cylinder so that pressure acting on said side of the cylinder also acts the friction drive actuator.

8. An apparatus according to claim 7 arranged so that pressure acting on the first end portion axially moves the piston so as to effect engagement of the first rotatable member with the second rotatable member, and pressure acting on the second end portion axially moves the piston so as to effect disengagement of the same.

9. An apparatus according to claim 7, wherein the passageway extends through the piston between the first cylinder and the second cylinder.

10. An apparatus according to claim 7, wherein the fluid communication means includes a bore through the housing.

11. An apparatus according to claim 7, wherein sealing means are located around the piston at a predetermined axial distance from each side of the radial hole, the sealing means defining a zone in which pressure from the passageway acts.

12. apparatus according to claim 11, wherein the sealing means are sealing rings positioned around the piston.

13. An apparatus according to claim 11, wherein the sealing means are positioned such that the zone is isolated from the fluid communication means when the piston has moved the first rotatable member a predetermined distance towards engagement with the driven member.

14. An apparatus according to claim 1, wherein the piston includes a valve arrangement whereby the pressure ceases to act on the friction drive actuator just before or at the same time as positive engagement is established between the first and second rotatable members.

15. An apparatus according to claim 1, wherein the friction drive actuator is biased away from activating the friction drive.

16. An apparatus according to claim 15, wherein the friction drive actuator is biased by a spring.

17. An apparatus according to claim 1, wherein the friction drive actuator includes an annular pressure ring slidably mounted in the housing.

18. An apparatus according to claim 17, wherein the area of the annular pressure ring on which the pressure acts is greater than the area of the piston on which pressure acts.

19. An apparatus according to claim 1, wherein the means for producing a friction drive include a plurality of axially movable friction plates, a first set of which are rotatably engaged with the first rotatable member and a second set of which are rotatably engaged with the second rotatable member, the plurality of friction plates being arranged so that the first and second set are pushed together by the friction drive actuator.

20. An apparatus according to claim 19, wherein each friction plate of the first set is provided between friction plates of the second set.

21. An apparatus according to claim 1, wherein the second rotatable member includes a gear mounted on a shaft, the gear being engageable with the first rotatable member to effect engagement between the first and second rotatable members.

22. An apparatus according to claim 21, wherein the gear mounted on the shaft is axially movable, and the friction drive actuator is arranged to act on the gear to push it to activate the friction drive.

23. An apparatus according to claim 21, wherein the first rotatable member includes a sleeve coaxial with the shaft, the sleeve being engagable with the gear.

24. An apparatus according to claim 23, wherein the piston includes a fork member with fingers that engage a groove in the outer surface of the sleeve.

25. An apparatus according to claim 1, wherein the pressure is provided by compressed gas.

26. An apparatus according to claim 1, wherein the pressure is provided by compressed air.

* * * * *

UNITED STATES PATENT AND TRADEMARK OFFICE
CERTIFICATE OF CORRECTION

PATENT NO.         : 7,497,311 B2
APPLICATION NO. : 10/560566
DATED                 : March 3, 2009
INVENTOR(S)       : Reginald Knowles It is certified that error appears in the above-identified patent and that said Letters Patent is hereby corrected as shown below:

In column 4, line 46, delete "engagable" and insert -- engageable --, therefor.

In column 4, line 52, delete "engagable" and insert -- engageable --, therefor.

In column 6, line 11, after "groove" insert -- 20 --.

In column 6, line 49, after "ring" insert -- 25 --.

In column 8, line 45, delete "rotawink" and insert -- rotowink --, therefor.

In column 8, line 63, delete "rotawink" and insert -- rotowink --, therefor.

In column 10, line 20, before "start" delete "10".

In column 12, line 51, in Claim 12, before "apparatus" insert -- An --.

In column 14, line 9, in Claim 23, delete "engagable" and insert -- engageable --, therefor.

Signed and Sealed this

Nineteenth Day of May, 2009

JOHN DOLL
*Acting Director of the United States Patent and Trademark Office*